United States Patent [19]

Parisi

[11] Patent Number: 4,659,350
[45] Date of Patent: Apr. 21, 1987

[54] AIRTIGHT ROTATING JOINT

[75] Inventor: Giuseppe Parisi, Turin, Italy

[73] Assignee: Cselt - Centro Studi e Laboratori Telecomunicazioni S.P.A., Turin, Italy

[21] Appl. No.: 689,920

[22] Filed: Jan. 9, 1985

[30] Foreign Application Priority Data

Jan. 10, 1984 [IT] Italy .................. 67017 A/84

[51] Int. Cl.[4] ............................... B01D 46/00
[52] U.S. Cl. ........................... 55/503; 55/504; 285/136; 285/281
[58] Field of Search ............... 285/134, 136, 190, 279, 285/281; 210/446, 451, 453; 55/504, 505, 503

[56] References Cited

U.S. PATENT DOCUMENTS

| | | | |
|---|---|---|---|
| 1,235,998 | 8/1917 | Neeley | 55/504 |
| 2,762,534 | 9/1956 | Kish | 285/130 |
| 3,431,898 | 3/1969 | Driscoll et al. | 55/505 |
| 3,522,882 | 8/1970 | Dykes | 210/446 |
| 3,776,578 | 12/1973 | Jessup et al. | 285/281 |
| 4,113,288 | 9/1978 | Cox | 285/281 |
| 4,465,096 | 8/1984 | Voisine | 285/316 |

Primary Examiner—Bernard Nozick
Attorney, Agent, or Firm—Karl F. Ross; Herbert Dubno

[57] ABSTRACT

Airtight rotating joint, composed of a fixed part and of a rotating one both equipped with an axial conduit ending in a chamber, rendered airtight and separated from the outside by means of a second pressurizable chamber. The joint is particularly suited to equipment where high-purity materials are to be handled.

8 Claims, 2 Drawing Figures

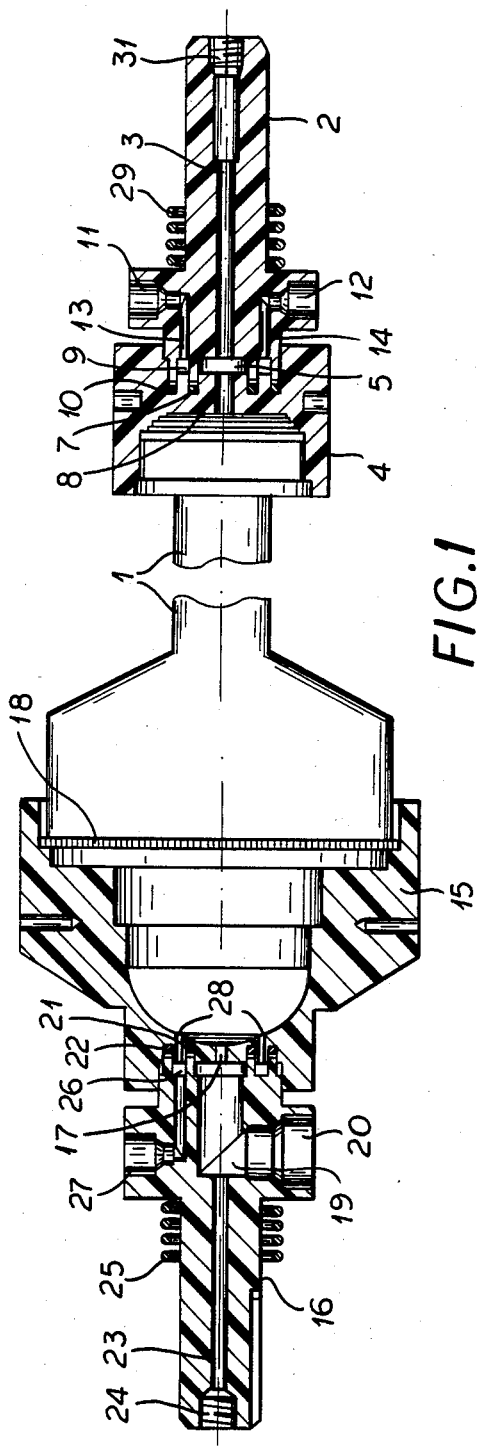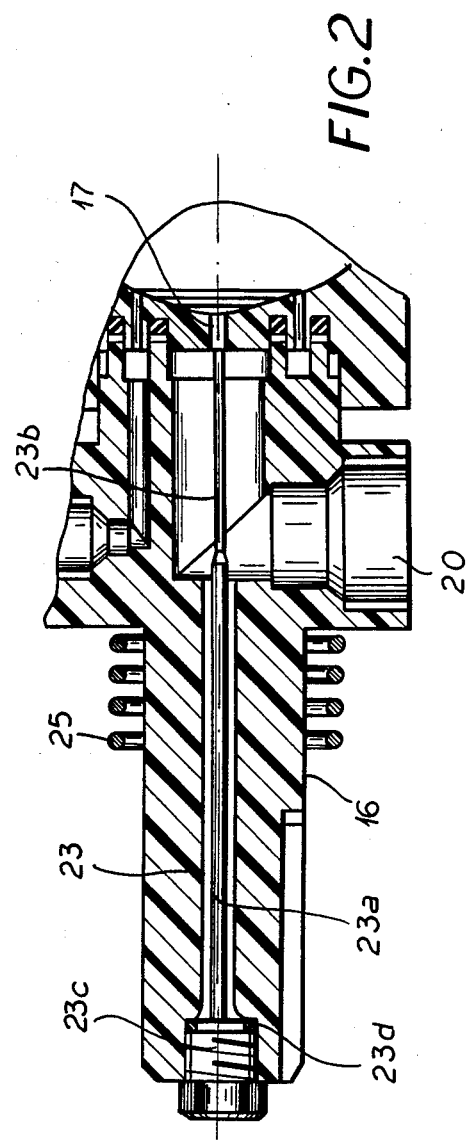

AIRTIGHT ROTATING JOINT

FIELD OF THE INVENTION

The present invention relates to mechanical devices for use in equipment for chemical processes and, more particularly, it concerns a airtight rotating joint permitting the transfer without fluid. leaks between a rotating part and a fixed part.

BACKGROUND OF THE INVENTION

The technical problem to be solved is the connection of a rotating part of an apparatus for carrying out chemical processes, where toxic and strong corrosive gases are involved, with a fixed part, consisting for instance of a feeding line for said gases or an exhaust line.

Of course the inside of the rotating part has to be strictly isolated from the environment and the required pressure to be maintained is a function of the process.

There are to be avoided both infiltration from the outside of materials such as gas vapor or dust, as they might pollute the process materials contained in the rotating part, and leakage of the materials which are present inside and which might be particularly toxic and corrosive. Of course all the joint parts must be made of an inert material to avoid their corrosion, and to prevent the joint.

OBJECT OF THE INVENTION

The above object of the invention is to provide an improved rotating joint which allows fluids to be convected from the rotating part to the fixed one and vice versa without allowing infiltration from the environment or leakage from the inside of polluting or toxic materials, and which is corrosion resistant.

SUMMARY OF THE INVENTION

There is provided by the present invention an airtight rotating joint, composed of a rotating part and a fixed one, in which the fixed part comprises a first axial conduit connected to a first chamber, placed between the rotating part and the fixed part, hermetically sealed by a first O ring compressed and communicating through a second conduit with the axial end zone of the rotating part, a second chamber comprised between the rotating part and the fixed one, hermetically sealed by the first O ring and by a second higher-diameter O ring surrounding the first chamber and communicating with the outside through a third conduit and through a fourth conduit with the outside or with the axial end zone of the rotating part.

BRIEF DESCRIPTION OF THE DRAWING

An embodiment of this invention will now be described, by way of example, with reference to the accompanying drawing in which:

FIG. 1 is a longitudinal sectional view of the device; and

FIG. 2 is a detail view of a portion of the device.

SPECIFIC DESCRIPTION

The joint is used here in equipment for fabricating optical-fiber preforms by chemical vapor deposition (CVD).

According to this process, the raw material from which the optical fiber are made is obtained by the reaction of suitable gases and vapors.

The reaction chamber consists of a quartz tube 1, which is rotated around its axis, while the material obtained from the reaction is deposited on the internal walls. The reaction is aided by a hydrogen flame burner, not shown in the drawing, which is moving along the axis of the quartz tube.

Reactant gases, such as silicon tetrachloride, germanium tetrachloride, oxygen, Freon, etc. arriving from the feeding system, are introduced through the fixed part 2 of the inlet rotating joint GE.

The part 2 is provided with an inlet conduit 3 for the reactants adapted to house a flexible conduit coming from the main feeding system.

The seal between the conduit and the fixed part is ensured by an O ring placed on the bottom of threaded conduit 31, and pressed by a screw with an axial hole through which the conduit enters.

Fixed part 2 is connected to rotating part 4 of the joint through a seal cylindrical chamber 5 for the reactants, rendered airtight by elastic ring 7 and allows the reactant flow to reaction conduit 1 through a conduit 8.

A second annular chamber 9 is used to improve the seal of the first chamber 5, as small leakages towards the inside or the outside through the rotating surfaces are always possible. This second chamber is rendered airtight by means of O ring 10 and is pressurized by a continuous and controlled flow of highly-pure oxygen and argon, obtained through an inlet orifice 11 and an outlet orifice 12, connected to chamber 9, by means of conduits 13 and 14 respectively.

The pressure in chamber 9 is maintained at a value which is intermediate between the value present inside chamber 5 and that of the environment.

Thus, polluting fluid infiltrations from the outside towards chamber 9 and from chamber 9 towards chamber 5, connected with the reaction conduit, are avoided.

Outlet rotating joint GU, composed of a rotating part 15 and of a fixed part 16, is placed at the other end of conduit 1.

This second joint is to maintain a pre-determined pressure inside the conduit. That is obtained by making in the axial zone of the rotating part 15 a suitable diameter outlet hole 17 in view of the required pressure and of the reactant flow traversing the reaction conduit. To avoid the solid particles present as reaction products from accumulating near this hole, part 15 is equipped with a filter 18 with smaller diameter holes. Hole 17 is in communication with a cylindrical exhaust chamber 19 and an outlet 20, comprised in the fixed part 16, through which the reaction products flow. The seal of chamber 19 is ensured by O ring 21. A conduit 23 houses a sliding rod 23a, equipped with a pin 23b capable of penetrating inside hole 17 to free it from possible blockings. The rod is hermetically sealed by means of a screw 23c with a hole fastened into conduit 24, and an O ring 23d pressed against the bottom.

Also this outlet joint is equipped with a second seal annular chamber 26, inserted between O rings 21 and 22 and made to communicate with inlet 27 and with holes 28, communicating with reaction tube 1.

Through inlet 27 there is conveyed a pressurization gas such as oxygen or argon in highly pure form, whose flow ensures the desired pressure inside the reaction conduit. A system using a particular pressurization technique is described, for instance, in European Patent Application No. 83102078.9, corresponding to U.S. Ser. No. 472,063 published on Sept. 14, 1983, in the name of the applicant. Chamber 19 is connected to an external suction system to help the flow of the reaction products; in such a way chamber 1 has a lower pressure than the environment.

As a consequence, leakages of toxic materials towards the outside are rare, while possible polluting fluid infiltrations are prevented by the presence of chamber 26, which is at higher pressure than the environment.

Pressure difference between the reaction conduit and chamber 19 is due, as previously said, to the presence of hole 17 whose diameter has been properly calculated.

Fixed parts 16 and 2 of joints GU and GE are held in contact with the respective rotating parts 15 and 4 by two springs 25 and 29, compressed between the fixed parts themselves and the part of the device which supports the conduit and the joints. In case the joint is to be used in a corrosive environment all its parts are advantageously made of polytetrafluoroethylene.

Variations and modifications to the above embodiments may of course be made without departing from the scope of the invention.

I claim:

1. An air-tight rotating joint comprising:
   an inlet fitting having an inlet fixed part, and an inlet rotating part sealingly connected to said inlet fixed part;
   a reaction conduit sealingly connected to said inlet rotating part;
   an outlet fitting having an outlet rotating part sealingly connected to said reaction conduit, and an outlet fixed part sealingly connected to said outlet rotating part,
   each of said rotating parts having a respective end zone defining a first chamber along an axis of the respective fitting with a respective end zone of the respective fixed part,
   each of said fixed parts being formed with a first axial passage communicating with the respective first chamber,
   each of said rotating parts being formed with a second axial passage communicating between the respective first chamber and said reaction conduit;
   a respective first O-ring compressed between the end zones of the fixed and rotating parts of each of said fittings outwardly of the respective first chamber for sealing same;
   a respective annular second chamber formed between the fixed and rotating parts of each of said fittings outwardly of the respective first O-ring; and
   a respective second O-ring of greater diameter than said first O-ring compressed between the end zones of the fixed and rotating parts of each of said fittings outwardly of the respective second chamber for sealing same between the O-rings of the respective fitting,
   each of said fixed parts being formed with a respective third passage communicating with the respective second chamber for the supply of a fluid to the respective second chamber,
   each of said second chambers being further provided with an outlet for said fluid at least one of which is a fourth passage formed in the respective fixed part and open to the outside.

2. An air-tight rotating joint as defined in claim 1 wherein each of said second chambers is pressurized by a continuous and controlled flow of a gas introduced to the respective third passage.

3. An air-tight rotating joint as defined in claim 1, further comprising a rod received in at least one of said first passages and equipped with a pin capable of penetrating into the respective second passage.

4. An air-tight rotating joint as defined in claim 1 wherein at least one of said rotating parts is equipped with a filter interposed between the respective first chamber and said reaction conduit.

5. An air-tight rotating joint as defined in claim 1 wherein at least one of said second passages has a diameter which is prefixed as a function of a desired pressure difference between the respective rotating part and the respective fixed part.

6. An air-tight rotating joint as defined in claim 1, further comprising a respective spring urging each fixed part against the respective rotating part.

7. An air-tight rotating joint as defined in claim 1 wherein said first, third, and fourth passages are each provided with a threaded inlet adapted to receive a respective flexible conduit and and an O-ring sealing same.

8. An air-tight rotating joint as defined in claim 1 wherein said parts are composed of polytetrafluoroethylene.

* * * * *